(12) United States Patent
Kienzle et al.

(10) Patent No.: US 8,961,633 B2
(45) Date of Patent: Feb. 24, 2015

(54) FILTER CLEANING IN A VACUUM HAVING A FLAP ELEMENT

(75) Inventors: Martin Kienzle, Illerrieden (DE); Günther Werbach, Weißenhorn (DE); Rainer Hafenrichter, Buch (DE); Klaus Dietz, Ulm (DE)

(73) Assignee: Nilfisk-Advance A/S, Broendby (DK)

(*) Notice: Subject to any disclaimer, the term of this patent is extended or adjusted under 35 U.S.C. 154(b) by 838 days.

(21) Appl. No.: 13/063,830

(22) PCT Filed: Sep. 5, 2009

(86) PCT No.: PCT/EP2009/006461
§ 371 (c)(1), (2), (4) Date: Jun. 2, 2011

(87) PCT Pub. No.: WO2010/028787
PCT Pub. Date: Mar. 18, 2010

(65) Prior Publication Data
US 2011/0226130 A1    Sep. 22, 2011

(30) Foreign Application Priority Data
Sep. 13, 2008    (DE) .................. 10 2008 047 047

(51) Int. Cl.
| | | |
|---|---|---|
| *B01D 41/00* | (2006.01) | |
| *B01D 46/00* | (2006.01) | |
| *A47L 9/20* | (2006.01) | |
| *B01D 46/02* | (2006.01) | |
| *B01D 46/24* | (2006.01) | |

(52) U.S. Cl.
CPC ............ *B01D 46/0068* (2013.01); *A47L 9/20* (2013.01); *B01D 46/02* (2013.01); *B01D 46/24* (2013.01); *B01D 2265/023* (2013.01); *B01D 2273/16* (2013.01); *B01D 2279/55* (2013.01)
USPC .............. 55/302; 55/282; 55/284; 55/293; 55/303; 15/345; 15/347; 15/348; 15/353

(58) Field of Classification Search
USPC ................ 15/345, 347–353, 405–406; 55/282–305; 95/278–282
See application file for complete search history.

(56) References Cited

U.S. PATENT DOCUMENTS

| | | | |
|---|---|---|---|
| 6,458,178 B1 * | 10/2002 | Dietz et al. ............... | 55/302 |
| 2007/0067944 A1 * | 3/2007 | Kitamura et al. ......... | 15/353 |
| 2009/0106933 A1 | 4/2009 | Bruntner | |

FOREIGN PATENT DOCUMENTS

| | | |
|---|---|---|
| DE | 199 49 095 C2 | 10/2002 |
| DE | 101 01 219 B4 | 7/2004 |

(Continued)

*Primary Examiner* — Thomas McKenzie
(74) *Attorney, Agent, or Firm* — Browdy and Neimark, PLLC

(57) ABSTRACT

The invention relates to filter cleaning in a vacuum having a switchable flap element, the cleaning of the filter or of parts of the filter being carried out by supplying a secondary air flow to the interior of the filter to be cleaned, and air being able to flow through the filters separately from each other from the outside to the inside in the vacuum container in a sealed manner, and a flap element disposed in a chamber housing being pivotable, by means of the pivoting of which openings may be closed and released, the secondary air flow reaching the surface of the filter to be cleaned from the inside toward the outside in pulses, characterized in that the flap element comprises at least two partial flaps, the pivoting of which is actuated by a pivot drive, the respective partial flap optionally closes the outflow opening of the respective filter chamber in the direction of the intake opening of the suction turbine, the blow-out side of the suction turbine delivers the created overpressure air into an overpressure chamber in which a chamber housing is disposed, the at least one drive element to be suddenly actuated comprises openings to be opened and closed, upon the opening of which the overpressure air flows through the chamber housing optionally into an impulse channel which branches off at that location and introduces the air into one or into the other filter chamber for cleaning.

16 Claims, 4 Drawing Sheets

(56) References Cited

FOREIGN PATENT DOCUMENTS

Figure 1:
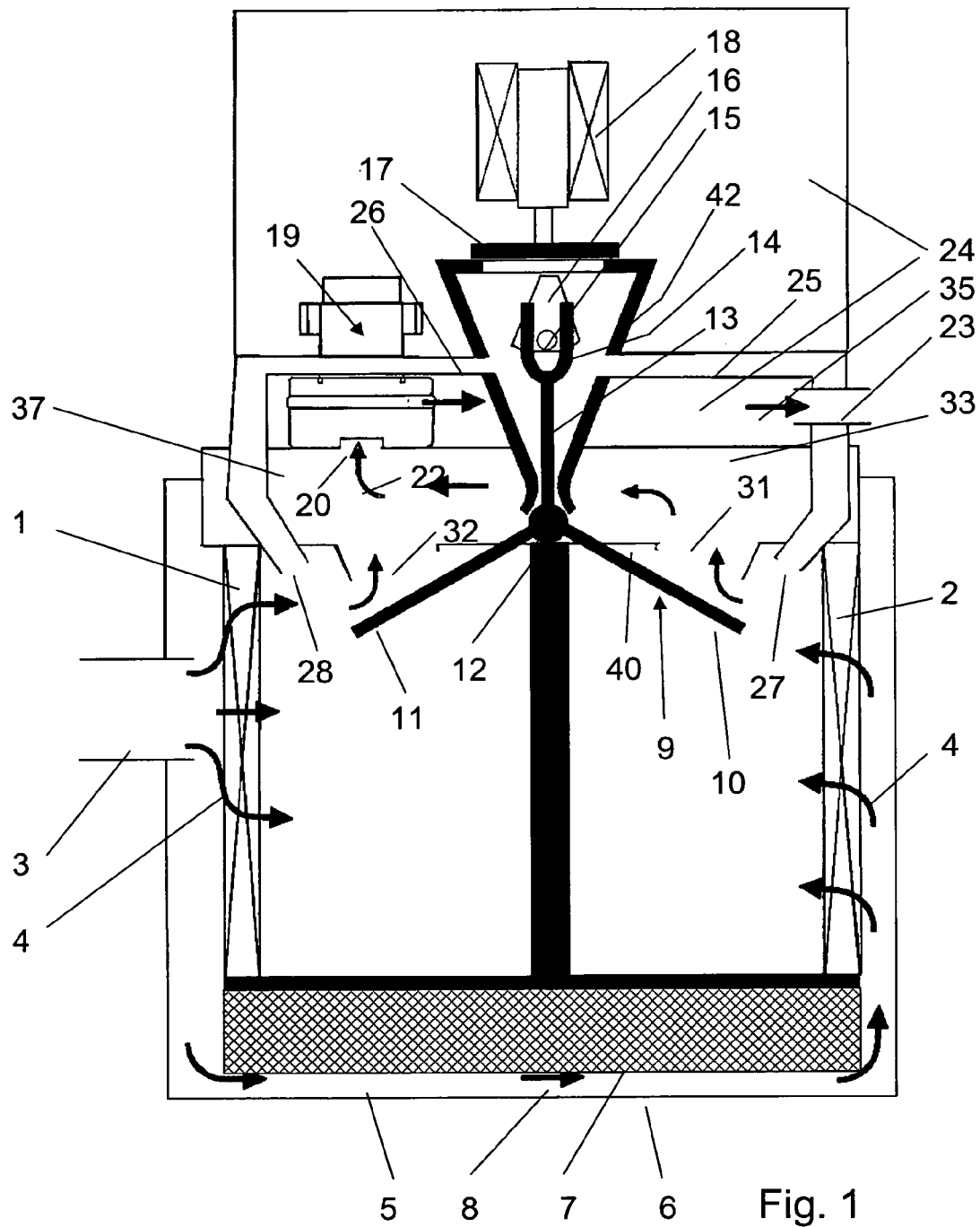

| | | |
|---|---|---|
| DE | 20 2007 015242 U1 | 12/2007 |
| EP | 1 092 382 A2 | 4/2001 |
| EP | 1 118 303 | 7/2001 |

* cited by examiner

FILTER CLEANING IN A VACUUM HAVING A FLAP ELEMENT

The invention relates to a filter cleaning with a flap element according to the preamble of claim 1.

The basic principle of the filter cleaning consists in that the particular filter compartment with the filter half to be cleaned is first disconnected from the suction air flow of the suction turbine and a false-air flow that is generated from the blow-out-air flow of the suction turbine is then passed into the filter compartment in a pulsed manner, in order to clean the surface thereof that is loaded on the outside with dirt particles in a direction from the inside to the outside.

Such a filter cleaning is known from the older patent DE 199 49 095 C2 of the applicant's. The false-air flow is controlled in such a way that an approximately X-shaped flap element disposed in a housing abruptly changes its position by utilizing differences in pressure between the suction air flow and the atmospheric pressure, and opens and/or closes one or a plurality of openings in the housing, such that the false-air flow reaches the one filter half to be cleaned in a pulse-like manner, while the other filter half remains in the suction air flow.

Since the air pulse is used also for switching over the flap element, energy for the cleaning is therefore lost. This reduces the pulse intensity of the blow-out-air cleaning burst.

EP 1 118 303 A2 discloses a similar, pressure-controlled switch-over of the flap element, which involves the same shortcomings.

In DE 101 01 219 B4 there is described a switch-over from a cleaning air flow to a suction air flow by means of two electromagnetically actuated three-way valves. Because two separately actuated three-way valves are used that are disposed in chambers which are separate from one another, the required effort and expense for implementing the chamber design and actuation of the valves is significant.

It is therefore the aim of the invention, proceeding from DE 101 01 219 B4, to ensure a reliable cleaning of the two filter halves, while at the same time providing for an improved degree of cleaning effectiveness.

This aim is achieved by the features of claim 1.

According to the invention, an approximately Y-shaped flap element, comprising two flap parts that are disposed at an angle to one another, is now actuated by a cost-effective servomotor drive. Because such servomotors are used in a variety of applications in model-making, they can be used cost-effectively for the purposes of the invention.

In a preferred embodiment, the servomotor has a drive arm that engages with an associated U-shaped seat on a projection of the flap element and moves same into one or the other pivot position. Altogether, there are three different pivot positions, namely a central position of the flap element, a left and a right position.

In the central position the dirty-air flow flows through both filter halves and both of them are therefore in functioning mode, while in the right pivot position (FIG. 2) only the right filter half remains in functioning mode and cleans the dirt flow, while the left filter half is cleaned by the backflow that is generated in a pulse-like manner in the opposite direction from the dirt cleaning direction.

The discharged-air cleaning flow is induced by the abrupt opening of a control flap or control opening, an electromagnetically actuated solenoid being used for actuation of this control flap.

The following explanations are provided with respect to the prior art in comparison with the present invention:

While the known X-flap was not operated positively controlled, but instead was switched over by the incoming airflow, the present Y-flap is an electric-motor operated flap. This presents the advantage that one can, in one filter half, induce a plurality of cleaning pulses onto this filter half in succession, thereby attaining an improved cleaning of this filter half. The switch-over between one filter half and the other, accordingly, is a positively controlled switch-over.

The invention is characterized in that a flap element that can be actuated at will by means of an electric motor, electromagnetically, or in some other way, can be moved into three different pivot positions, and a neutral position exists in this arrangement in which both filter halves are in operation. The invention is further characterized in that, through the switch-over by means of the electric-motor drive, selectively one or the other filter half can be cleaned.

It is a further advantage of the invention that for the flap actuation for the cleaning air a single solenoid is provided that operates this single flap, whereas in the prior art two different solenoids with two different flaps were provided.

The advantage in this arrangement lies in that, according to the pivot position of the Y-flap, the cleaning air can be fed abruptly, in a pulse-like manner and in repeated succession, selectively to one or the other filter half, which was not the case in the prior art.

The subject matter of the present invention extends not only to the subject matter of the individual claims, but also to the combination of the individual claims with one another.

All of the details and features disclosed in the documents, including in the abstract, in particular the dimensional embodiment illustrated in the drawings, are claimed as essential to the invention, to the extent that they are novel over the prior art, either individually or in combination.

The invention is explained in more detail below with reference to drawings illustrating just one possible method of implementation. In the process, additional features and advantages of the invention will become apparent from the drawings and their description.

In the drawings

Figure 2:
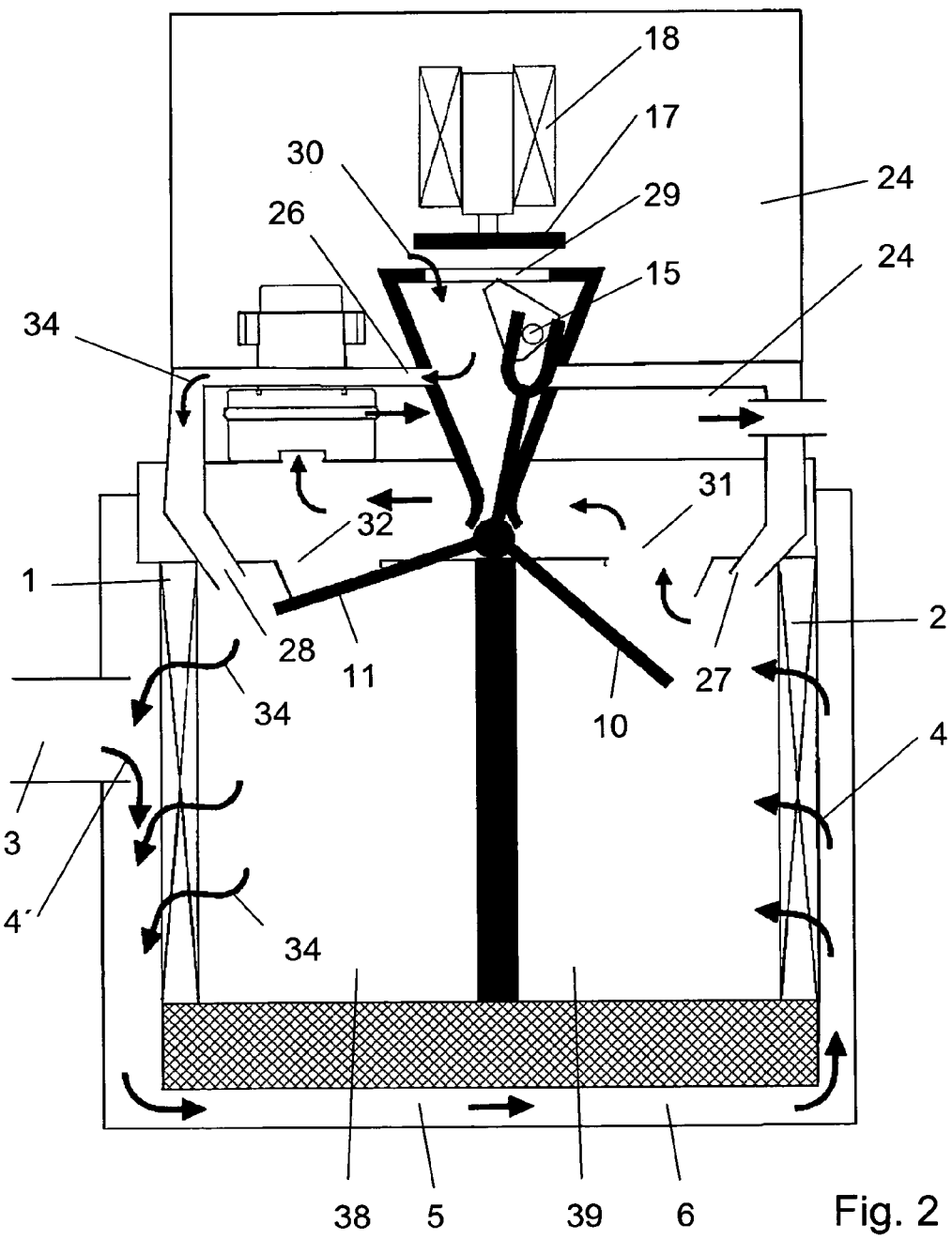
Figure 3:
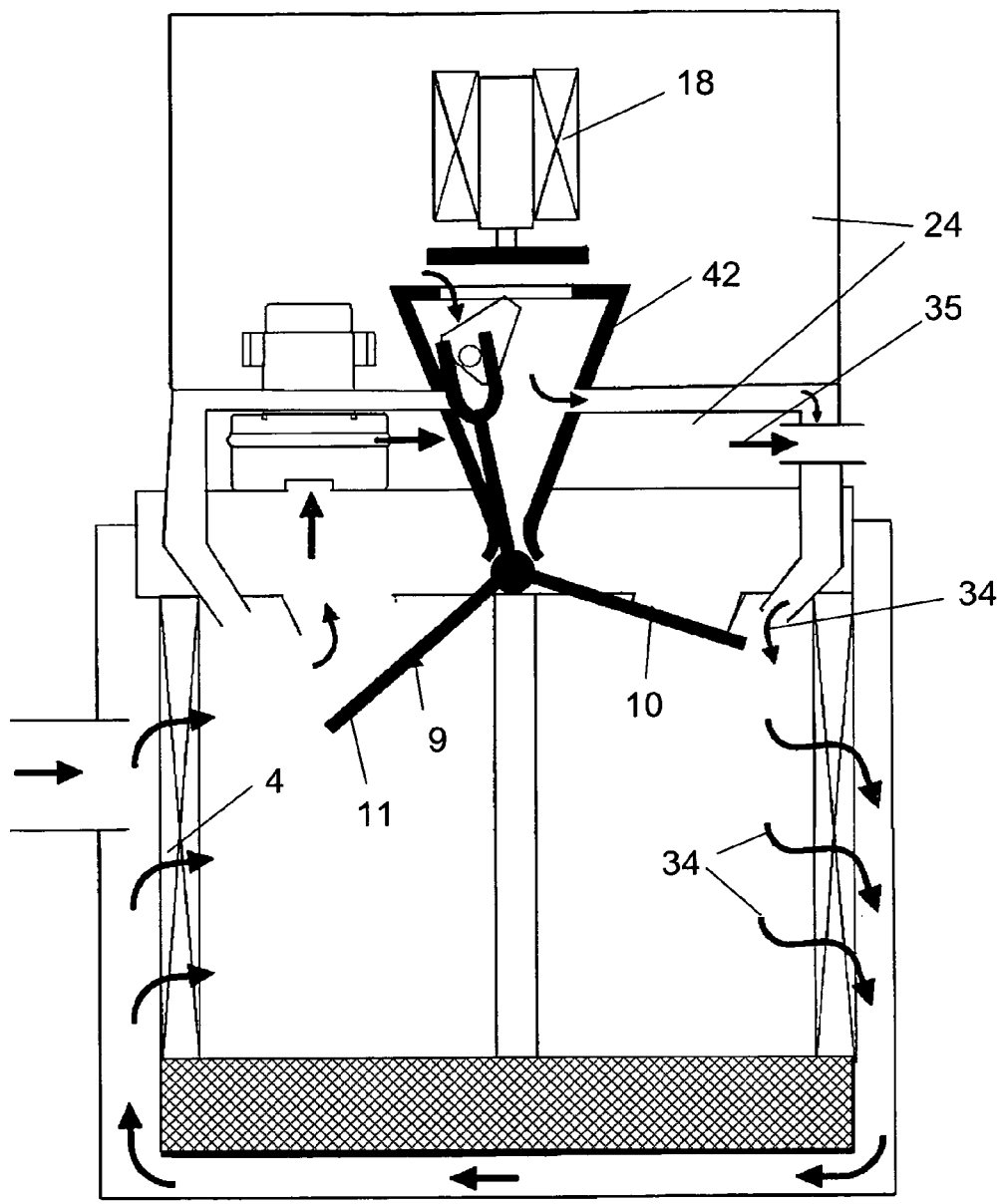
Figure 4:
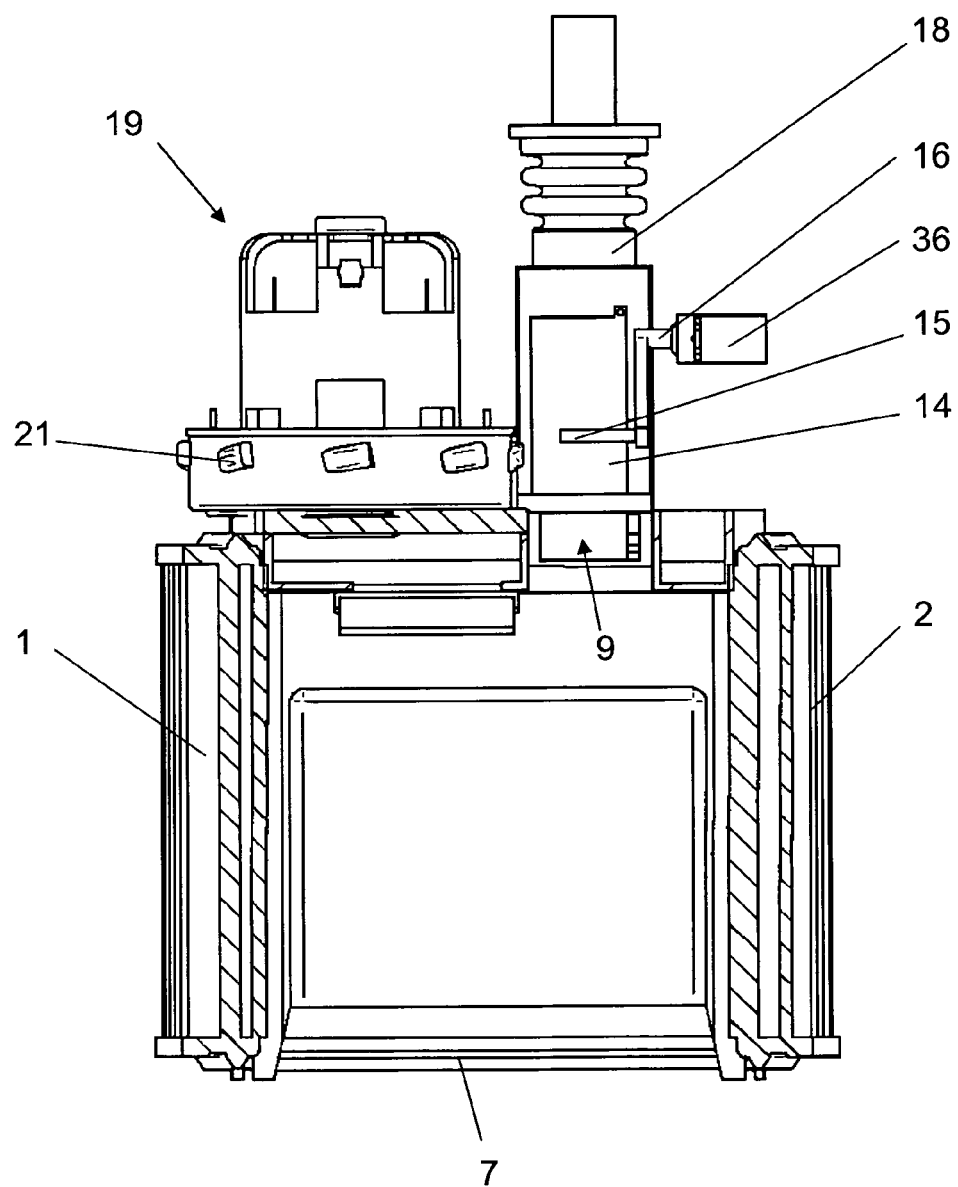

FIG. 1 shows, in schematized form, a section through a vacuum cleaner according to the invention in a neutral flap position with air flowing through both filter halves, FIG. 2 shows a section according to FIG. 1 with cleaning of the left filter half, FIG. 3 shows a section according to FIG. 1 with cleaning of the right filter half, FIG. 4 shows, in schematized form, the illustration of the filter with the actuation elements and the suction turbines.

FIG. 1 generally illustrates a vacuum cleaner comprising a receptacle 6, inserted into which, in a sealing manner, is a filter arrangement comprising an annular filter, the annular filter comprising two filter halves 1, 2. The filter halves 1, 2 are sealed off from one another and can be operated either in parallel, or one half can be cleaned and the other filter half can continue to remain in use. An intake nozzle 3 opens into the receptacle 6, by means of which intake nozzle the intake air flows in, in the arrow direction 4, and in the process—in the neutral position of FIG. 1—flows through both filter halves 1, 2 in the arrow directions 4.

It is illustrated that the air from the intake nozzle 3 is distributed over the bottom space 5 of the receptacle 6 also in an annular pattern and therefore also flows through the right filter half 2. The air flow in this case is effected in the arrow direction 8. In order to simplify the illustration, the receptacle 6 is drawn very short and with a small volume. It can also be designed in the form of a bag or as a very large receptacle;

importance being placed on that the entire annular filter is enclosed in the region of a seal 7 on the bottom, in order to create an inner filter space.

The switch-over element according to the invention comprises a Y-flap 9 comprising two partial flaps 10, 11 that are arranged at an angle to one another and are connected to one another rigidly and supported in the region of a pivot bearing 12 in a manner so as to be able to pivot. Adjoining the pivot bearing 12, integral in rotation therewith, is a lever 13 that ends in an upper, upwardly open fork 14.

The lever 13 with the fork 14 engages in a sealed manner with a compartment housing 42, through which the cleaning air that is generated in a pulse-like manner flows.

The drive axis of the servomotor 36 (see FIG. 4) is connected to an actuation pin 15 integral in rotation therewith, which actuation pin is disposed on a pivoting part that is supported in a pivotable manner in a pivot point 16 on the housing of the vacuum cleaner.

The actuation pin 15 engages with the fork 14 and is capable, by means of a pivoting actuation of the lever 13, of pivoting the Y-flap from a neutral position toward one side or the other. This causes either the one partial flap 10 or the other partial flap 11 to be moved against the outflow openings 31, 32 for sealing same.

A solenoid 18 is used as the actuation means for the pulse flap 17, which solenoid, however, in other embodiments, may also be designed in the form of some other element providing the same action. A servomotor, for example, or some other actuation element operating in a pulse-like manner can take the place of the solenoid 18.

In the shown neutral position of FIG. 1 both filter halves 1, 2 are thus in functioning mode. The dirt-laden air flows in the arrow direction 4 through both filter halves 1, 2 and through the filter compartments 38, 39 defined there and flows through the two outflow openings 31, 32 because the two partial flaps 10, 11 release the two outflow openings 31, 32. The outflow openings 31, 32 are an air-conducting component of a collection channel 37, in such a way that the air flowing in through the two openings 31, 32 is drawn in, in arrow direction 22, by the intake opening 20 of the suction turbine 19, where it is compressed and leaves the blow-out opening 21 in the drawn arrow direction 35. The air flowing into the filter compartment 38, 39 is therefore drawn in, in the arrow direction 22, by the suction turbine 19 via its intake opening 20.

The suction turbine 19 delivers the air drawn in from the filter compartments 38, 39 under overpressure into an overpressure chamber 24. The clean air that has been compressed in this manner is transported to the outside via the blow-out channel 23.

In the context of the present invention, provision may also be made, of course, that the air in the arrow direction 35 can also be used for cooling the suction turbine 19. However, a separate cooling for the motor may also be provided.

Moreover, the overpressure chamber 24 is separated from the vacuum chamber of the vacuum cleaner by a wall 33.

Because overpressure exists in the entire overpressure chamber 24, in the neutral position of the pulse flap 17 this overpressure is not passed into the inner filter space. The reason being that the solenoid 19 holds the pulse flap 17 sealed by spring loading on the associated opening 29 in the compartment housing 42. Consequently, there also is no pulse air in the pulse channels 25, 26 branching off from the compartment housing 42.

If, however, as shown in FIG. 2, the actuation pin 15 is displaced via actuation of the servomotor 36 into (the right) one of the pivot positions, then the partial flap 11 closes off the outflow opening 32 and the solenoid 18 is actuated only after the outflow opening 32 is closed completely, and the pulse flap 17 is therefore released from the opening 29 abruptly and the overpressure that has built up in the overpressure chamber 24 now flows abruptly via the opening 29 in the arrow direction 30 downward into the chamber 42 and in the process enters into the channel 26 that allows the pulse air to flow, in the arrow direction 34, into the left vacuum cleaner space and flows, in the arrow direction 34, from the inside to the outside through the left filter half 1, thereby cleaning same. In the process, the fork 14 can close off the other, opposite opening to the pulse channel 25 in a sealing manner.

It is important that, when the partial flap 11 is closed, the solenoid can actuate the pulse flap 17 as often as desired in order to thus abruptly direct a plurality of successive pulse bursts in the arrow directions 34 against the inside of the filter half 1 and clean same with a high degree of efficiency.

The cleaning air accordingly flows via the blow-out opening 28 into the inner filter space.

If, on the other hand, as shown in FIG. 3, the Y-flap 9 is switched over, the blow-out air or cleaning air flows downward through the right blow-out opening 27 and the same cleaning process follows for the right filter half 2.

FIG. 4 shows further details of the drive, where it is illustrated that the servomotor 36 is disposed in the upper overpressure chamber 24, the drive axis of the servomotor being connected to the actuation pin 15 via a lever.

In the above-described embodiment the cleaning of two partial filters (1, 2) was described. However, the invention also relates to the cleaning of three or more partial filters. All of the above explanations shall then be understood analogously.

| Drawing Legend | |
| --- | --- |
| 1 | filter half |
| 2 | filter half |
| 3 | outlet nozzle |
| 4 | arrow direction 4' |
| 5 | bottom space |
| 6 | receptacle |
| 7 | seal |
| 8 | arrow direction |
| 9 | Y-flap |
| 10 | partial flap |
| 11 | partial flap |
| 12 | pivot bearing |
| 13 | lever |
| 14 | fork |
| 15 | actuation pin |
| 16 | pivot point |
| 17 | pulse flap |
| 18 | solenoid |
| 19 | suction turbine |
| 20 | intake opening |
| 21 | blow-out opening |
| 22 | arrow direction |
| 23 | blow-out channel |
| 24 | overpressure chamber |
| 25 | pulse channel |
| 26 | pulse channel |
| 27 | blow-out opening |
| 28 | blow-out opening |
| 29 | opening |
| 30 | arrow direction |
| 31 | outflow opening |
| 32 | outflow opening |
| 33 | wall |
| 34 | arrow direction |
| 35 | arrow direction |
| 36 | servomotor |
| 37 | collection channel |
| 38 | filter compartment |

-continued

Drawing Legend

| | |
|---|---|
| 39 | filter compartment |
| 40 | |
| 41 | |
| 42 | compartment housing |

What is claimed is:

1. A vacuum cleaner with a filter cleaning and a switchable flap element, the filter comprising two filter halves, wherein the cleaning of the filter takes place by supplying a false-air flow to an interior of each filter half to be cleaned, and air flows through the two filter halves separately from each other from the outside to the inside in a vacuum cleaner receptacle in a sealed manner and a flap element disposed in a compartment housing is pivotable, by the pivoting of which outflow openings are closed and released, the false-air flow reaching a surface to be cleaned of the filter halves from the inside to the outside in a pulse-like manner, wherein the switchable flap element comprises two partial flaps connected to one another at a common pivot point, the pivoting of the switchable flap element being actuated by a pivot drive,
   each one of the two partial flaps selectively closing off two outflow openings of a respective filter compartment of two filter compartments in the direction toward the intake opening of a suction turbine,
   a blow-out side of the suction turbine delivering created overpressure air into an overpressure chamber in which a compartment housing is disposed that has at least one opening to be opened and closed by a drive element that can be operated abruptly, upon opening of which the at least one opening the overpressure air flows through the compartment housing selectively into pulse channels branching off from the compartment housing, which passes the overpressure air into a respective one of the filter compartments for cleaning purposes,
   wherein the switchable flap element is a Y-flap element, and the compartment housing is disposed in the overpressure chamber approximately aligned with the center longitudinal axis of the filter, the interior of the compartment housing being connectable in an air-coupled manner to the overpressure chamber through the at least one opening and further comprising a lever disposed in an interior of the compartment housing that is connected to the Y-flap element at the pivot point and integral in rotation with the Y-flap element, the pivot actuation for the Y-flap element being effected by the lever.

2. The vacuum cleaner with a filter cleaning according to claim 1, further comprising a first wall disposed on top of the filter compartments which is penetrated by the outflow openings and wherein the outflow openings open into a collection channel in which intake air for the suction turbine is routed.

3. The vacuum cleaner with a filter cleaning according to claim 2, further comprising a second wall forming an upward boundary of the collection channel, wherein the overpressure chamber for conducting the blow-out air of the suction turbine is disposed an a side of the second wall opposite to the collection channel.

4. The vacuum cleaner with a filter cleaning according to claim 1, further comprising a fork at an end of the lever opposite to the pivot point, the fork engaging with an actuation pin of the pivot drive.

5. The vacuum cleaner with a filter cleaning according to claim 4, further comprising two outlet openings defined in the compartment housing, each outlet opening into one of the pulse channels, the lever and/or the fork are connected so as to selectively and alternately move in a sealing manner against the outlet openings, the pulse channels being directed into the interior of the filter compartment.

6. The vacuum cleaner with a filter cleaning according to claim 1, further comprising a servomotor serving as the pivot drive for the Y-flap element.

7. The vacuum cleaner with a filter cleaning according to claim 1, further comprising a pulse flap for closing off the at least one opening between the compartment housing and the overpressure chamber, and a solenoid for controlling the lifting of the pulse flap.

8. The vacuum cleaner with a filter cleaning according to claim 1, wherein the pivot bearing for the flap element is provided on the compartment housing.

9. A device for filter cleaning in a vacuum cleaner with a switchable flap element, the filter comprising two filter halves, wherein the cleaning of the filter takes place by supplying a false-air flow to an interior of each filter half to be cleaned, and air flows through the two filter halves separately from each other from the outside to the inside in a vacuum cleaner receptacle in a sealed manner and a flap element disposed in a compartment housing is pivotable, by the pivoting of which outflow openings are closed and released, the false-air flow reaching the surface to be cleaned of the filter halves from the inside to the outside in a pulse-like manner, wherein the switchable flap element comprises two partial flaps, the pivoting of the switchable flap element being actuated by a pivot drive,
   each of the two partial flaps selectively closing off one of the outflow openings of a respective filter compartment of two filter compartments in the direction toward the intake opening of a suction turbine,
   a blow-out side of the suction turbine delivering the created overpressure air into an overpressure chamber in which a compartment housing is disposed that has at least one opening to be opened and closed by a drive element that can be operated abruptly, upon opening of which the at least one opening the overpressure air flows through the compartment housing selectively into a pulse channel branching off from the compartment housing, which passes the overpressure air into a respective one of the filter compartments for cleaning purposes, and
   wherein the switchable flap element is a Y-flap element, and the compartment housing is disposed in the overpressure chamber approximately aligned with the center longitudinal axis of the filter , the interior of the compartment housing being connectable in an air-coupled manner to the overpressure chamber through the at least one opening and further comprising a lever disposed in an interior of the compartment housing that is connected to the Y-flap element at the pivot point and integral in rotation with the Y-flap element, the pivot actuation for the Y-flap element being effected by the lever.

10. The device according to claim 9, further comprising a fork at an end of the lever opposite to the pivot point, the fork engaging with an actuation pin of the pivot drive.

11. The device according to claim 10, further comprising two outlet openings defined in the compartment housing, each outlet opening into one of the pulse channels, the lever and/or the fork are connected so as to selectively and alternately move in a sealing manner against the outlet openings, the pulse channels being directed into the interior of the filter compartment.

12. The device according to claim 9, further comprising a servomotor serving as the pivot drive for the Y-flap element.

13. The device according to claim 9, further comprising a pulse flap for closing off the at least one opening between the compartment housing and the overpressure chamber, and a solenoid for controlling the lifting of the pulse flap.

14. The device according to claim 9, wherein the pivot bearing for the flap element is provided on the compartment housing.

15. The vacuum cleaner with a filter cleaning according to claim 9, further comprising a first wall disposed on top of the filter compartments which is penetrated by the outflow openings and wherein the outflow openings open into a collection channel in which intake air for the suction turbine is routed.

16. The vacuum cleaner with a filter cleaning according to claim 10, further comprising a second wall forming an upward boundary of the collection channel, wherein the overpressure chamber for conducting the blow-out air of the suction turbine is disposed an a side of the second wall opposite to the collection channel.

\* \* \* \* \*